United States Patent
Wu

(10) Patent No.: US 7,046,594 B2
(45) Date of Patent: May 16, 2006

(54) APPARATUS AND METHOD FOR OPTICAL STORAGE SYSTEM FOCUS CONTROL

(75) Inventor: Sheng-Hung Wu, Wai-Pu District Taichung County (TW)

(73) Assignee: Winbond Electronics Corp., (TW)

( * ) Notice: Subject to any disclaimer, the term of this patent is extended or adjusted under 35 U.S.C. 154(b) by 463 days.

(21) Appl. No.: 10/159,399

(22) Filed: May 30, 2002

(65) Prior Publication Data
US 2003/0223326 A1   Dec. 4, 2003

(51) Int. Cl.
*G11B 7/00*   (2006.01)

(52) U.S. Cl. ................................................. 369/44.36

(58) Field of Classification Search ............. 369/44.35, 369/44.36, 53.28, 44.41, 53.23
See application file for complete search history.

(56) References Cited

U.S. PATENT DOCUMENTS

| | | | | |
|---|---|---|---|---|
| 5,283,774 A | * | 2/1994 | Mashimo | 369/44.32 |
| 5,663,942 A | * | 9/1997 | Ishibashi et al. | 369/53.34 |
| 5,787,060 A | * | 7/1998 | Ando | 369/44.42 |

* cited by examiner

*Primary Examiner*—A. L. Wellington
*Assistant Examiner*—Lixi Chow
(74) *Attorney, Agent, or Firm*—Raymond Sun

(57) ABSTRACT

A method of adjusting the focus control for an optical storage system where light is reflected from a surface towards a lens. The method includes receiving a reflected light in the form of a spot, dividing the spot into a plurality of areas, generating an adjustment signal based on the relationship between the plurality of areas to determine the variation between the center point of the spot and a desired center point for the spot, combining the adjustment signal with an existing focus error signal to obtain a modified focus error signal, and utilizing the modified focus error signal to control the position of the sensor.

11 Claims, 3 Drawing Sheets

FE=(A+C)-(B+D)

FAR

A+C > B+D

NEAR

A+C < B+D

APPARATUS AND METHOD FOR OPTICAL STORAGE SYSTEM FOCUS CONTROL

BACKGROUND OF THE INVENTION

1. Field of the Invention

The present invention relates to an apparatus and method for improving the focus control of an optical storage system.

2. Background

Optical storage systems, which include CD drives and DVD drives and other known optical drives, have become very popular with the advent of the numerous multimedia applications that have been introduced into the market. FIG. 1 illustrates the general components of an optical disk drive 10 (such as a CD drive). A laser diode 12 emits a beam of laser that is reflected off a reflector 14 and directed through a lens 16 to impinge on the surface 18 of a disk 20 that contains data to be read. The light is reflected off the surface 18 back through the lens 16 to a sensor 22 which detects the light.

Depending on the nature of the optical path of the light in FIG. 1, the reflected light that is detected by the sensor 22 will either be a perfect dot (see FIG. 2), or an ellipse (see FIGS. 3 and 4). Referring first to FIG. 2, if the reflected light travels through perfect conditions in the optical path, the detected light will be a round dot having a total area that is equally divided (i.e., have the same area) into each of the four quadrants A, B, C and D. In other words, FIG. 2 shows a spot with the areas A+C=B+D. On the other hand, if the lens 16 is positioned at a distance that is closer to the surface 18 than optimum, then the detected light at the sensor 22 will take the form of the ellipse shown in FIG. 3, where A+C<B+D. Similarly, if the lens 16 is positioned at a distance that is further from the surface 18 than optimum, then the detected light at the sensor 22 will take the form of the ellipse shown in FIG. 4, where A+C>B+D. Thus, in FIGS. 3 and 4, the actual spot shifts or deforms from the central point between the four quadrants A, B, C, D.

A number of factors may contribute to "imperfect" conditions that may result in the detected light taking the form of one of the ellipses shown in FIG. 3 or 4. For example, the surface 18 of the disk 20 may be thermally deformed, or the disk 20 may be placed incorrectly to create an angular inclination with respect to the sensor 22. As a result, these changes in the distance between the lens 16 and the surface 18 of the disk 20 need to be compensated for during the reading of the data on the disk 20, so as to ensure accurate data reads, and to minimize the spot size.

To achieve this objective, it is desirable to maintain a minimum spot size on the surface 18, because the smallest spot size of the light on the surface 18 ensures that data is being accurately read, and that surrounding (i.e., not relevant) data is not being added or introduced to the desired data that is being read. Here, the desired data that is to be read would be represented by the "spot", so that a minimum spot size would provide more accurate data transfer. In the system of FIG. 1, the lens 16 helps to focus the light on to the smallest spot on the surface 18.

FIG. 5 is a graphical illustration of an S-curve of a focus error (FE) signal that can be used for focusing control. This S-curve is an industry standard that is used by most manufacturers to construct the focus control of their optical storage systems. The S-curve in FIG. 5 represents the relative physical distance x between the lens 16 and the reflection surface 18. In this regard, the center of the FE signal shown in FIG. 5 has a value of FE=0, which represents the electrical or originally assumed ideal condition shown in FIG. 2. One can set the regulation point to be FE=0, although any point along the S-curve can be designated to be the regulation point. Since FE is a voltage, the manufacturer can turn on the focus servo and watch the RF signal's AC amplitude vary as the power of the reflection signal changes. Thus, referring to FIG. 5, the FE value can be offset positively (i.e., to the right of the S-curve) or offset negatively (i.e., to the left of the S-curve) to change the distance x. Under the well-known defocus procedure, one can change the focus control from FE=0 to any physical position represented along the S-curve to determine the RF signal power generated at various points along the S-curve so as to determine the point MAX that yields the maximum signal energy that is received by the sensor 22. This is because the minimum spot size can be achieved by maximizing the signal energy of the reflected light that is received by the sensor 22. Under the defocus procedure, the difference between the values of the distance x (from FE to FE' as shown in FIG. 5) represents a delta FE value that can be used to find the maximum signal energy.

Unfortunately, there are applications (e.g., CD-R or CD-RW recording procedures) where the defocus procedure cannot be used. For example, the deformation of the reflection surface cannot be conveniently measured in advance, and the deformation sometimes occurs during recording. Thus, there still remains a need for an apparatus and method for improving the focus control of an optical storage system, which can be applied to any application.

SUMMARY OF THE INVENTION

It is an object of the present invention to provide an apparatus and method that improves the focus control of an optical storage system.

It is another object of the present invention to provide an apparatus and method that attempts to provide the minimum spot size of a reflected light that is detected by a sensor.

To accomplish the objectives of the present invention, there is provided a method of adjusting the focus control for an optical storage system where light is reflected from a surface towards a lens. The method includes receiving a reflected light in the form of a spot, dividing the spot into a plurality of areas, generating an adjustment signal based on the relationship between the plurality of areas to determine the variation between the center point of the spot and a desired center point for the spot, combining the adjustment signal with an existing focus error signal to obtain a modified focus error signal, and utilizing the modified focus error signal to control the position of the sensor.

BRIEF DESCRIPTION OF THE DRAWINGS

The invention can be more fully understood by reading the subsequent detailed description of the preferred embodiments, with reference made to the accompanying drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

Figure 5:
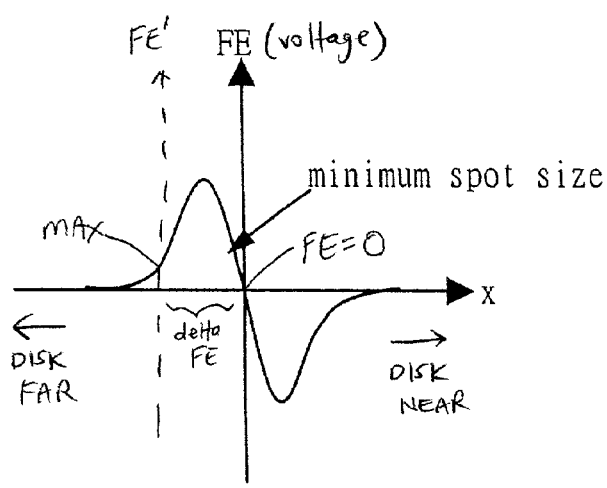
FIG. 5 is a graphical illustration of a conventional S-curve of a focus error (FE) signal that can be used for focusing control.

The present invention provides an apparatus and method for improving the focus control of an optical storage system, such as but not limited to CD drives (including CD-R and CD-RW drives), DVD drives, CD-ROMS, DVD RAMS, and other known optical drives. The present invention calibrates (i.e., modifies) the focus error (FE) by finding the shifted center point of the reflected spot (which may take the form of an ellipse), and then calculating a resulting offset value to modify the target focusing point along the S-curve of FIG. 5. This will achieve the objective of minimizing the spot size on the surface 18 of the disk 20. In particular, the present invention calculates a delta FE and uses it to adjust or modify the previous FE to obtain a modified focus error signal FE'. The modified focus error signal FE' is then applied by the controller of the optical storage system to modify the position of the sensor to obtain a new and accurate FE signal.

The present invention calculates its delta FE value in a different manner than the conventional defocus procedure. The present invention analyzes the relationship between the areas in the quadrants A, B, C and D of a spot, and determines the appropriate delta FE value based on this relationship.

Figure 1:
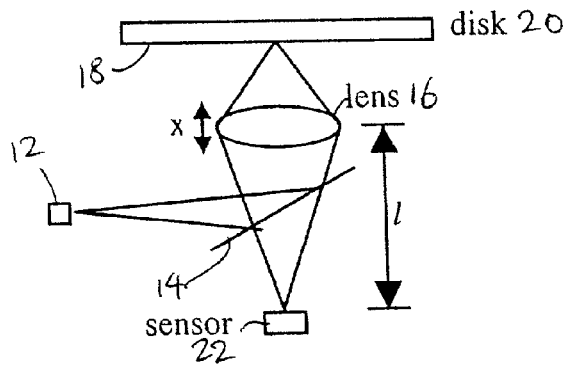
FIG. 1 is a very general schematic block diagram illustrating the primary components of a conventional optical storage system.
Figure 2:
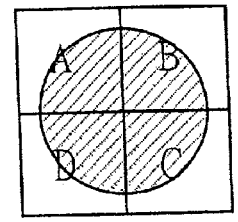
FIG. 2 is a graphical illustration of a perfectly focused spot for a reflected light.
Figure 4:
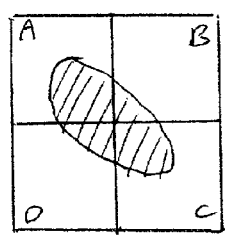
FIGS. 3 and 4 are graphical illustrations of deformed or shifted spots for reflected lights.
Figure 3:
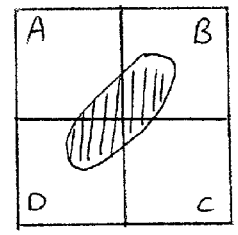

Based on the graphs illustrated in FIGS. 2–4, the present invention defines the focus error FE as:

$$FE=(A+C)-(B+D) \qquad (1)$$

where A, B, C and D are the areas of the spot (i.e., the reflected light that is detected by the sensor 22) in the respective quadrants A, B, C and D. Thus, in FIG. 2, since A=B=C=D, FE would be equal to zero, and the center of the spot will be at the center of the four quadrants A, B, C and D. Other ways to view this condition are:

$$A+B=C+D$$

$$A+D=B+C$$

Figure 6:
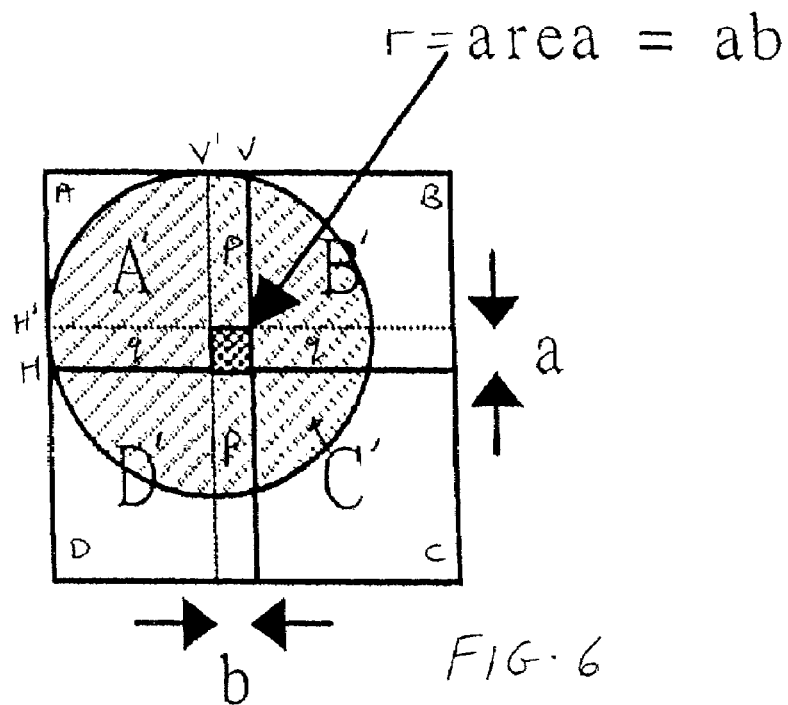
FIG. 6 is a grapical illustration of a spot whose center has shifted away from the center of the four quadrants A, B, C and D.

However, under less than perfect conditions, the center of the spot will shift away from the center of the four quadrants A, B, C and D. For example, FIG. 6 illustrates a spot whose center has shifted away from the center of the four quadrants A, B, C and D. The total area of the spot in quadrant A is equal to the combined areas of the areas labeled by A', p, q and r inside quadrant A. Thus, the total area of the spot in quadrants A and C is:

$$A+C=A'+p+q+r+C' \qquad (2)$$

Similarly, the total area of the spot in quadrant B is equal to the combined areas of the areas labeled by B' and q, and the total area of the spot in quadrant D is equal to the combined areas of the areas labeled by D' and p. Thus, the total area of the spot in quadrants B and D is:

$$B+D=B'+q+D'+p \qquad (3)$$

Since FE=(A+C)−(B+D), subtracting (B+D) from (A+C) will yield (A+C)−(B+D)=(A'+C')−(B'+D')+r Since (A'+C')=(B'+D'), then:

$$\text{delta } FE=r=ab \qquad (4)$$

where a and b are shown in FIG. 6.

Here, the region r represents an area of the reflection shift of the actual spot (i.e., the spot shown in FIG. 6). As a result, we can determine delta FE (i.e., r) once we know the dimensions of a and b, and if we assume that the spot size is a circle with a radius of 1.

First, we know:

$$pi=A+B+C+D \qquad (5)$$

$$2a=(A+B)-(C+D) \qquad (6)$$

If one divides equation (6) by equation (5), one will get:

$$2a/pi=[(A+B)-(C+D)]/(A+B+C+D)$$

By calculating for a, one obtains:

$$a=[[(A+B)-(C+D)]/(A+B+C+D)]*pi/2$$

Using similar principles and calculating for b, one obtains:

$$b=[[(A+D)-(B+C)]/(A+B+C+D)]*pi/2$$

Therefore:

$$\text{delta } FE=(ab/pi)(A+B+C+D), \text{ or}$$

$$\text{delta } FE = \frac{[(A+B)-(C+D)][(A+D)-(B+C)]}{(A+B+C+D)} * \frac{pi}{4} \qquad (7)$$

In other words, ab is a ratio of the entire circle (i.e., the spot). Thus, delta FE can be used to modify the previous FE so as to obtain a modified focus error FE'. In this regard, V and H in FIG. 6 are physical dividers of the original regions A, B, C and D, and V' and H' are the assumed new dividers of the shifted regions A, B, C and D. Thus, V and V' are symmetric to the new spot center, and H and H' are also symmetric to the new spot center.

Here, the physical implementation of the present embodiment requires a modification factor k to adapt for system variation. This modification factor k is described in greater detail below.

Figure 8:
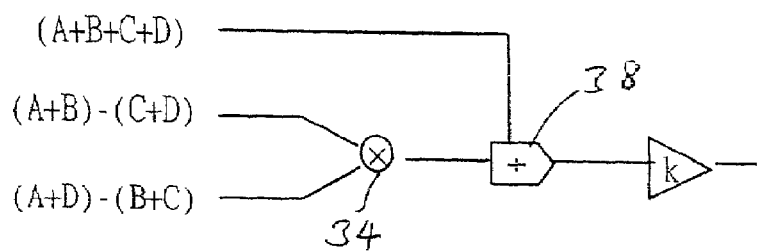
FIG. 8 is a circuit diagram of the error adjustment circuit of FIG. 7.
Figure 7:
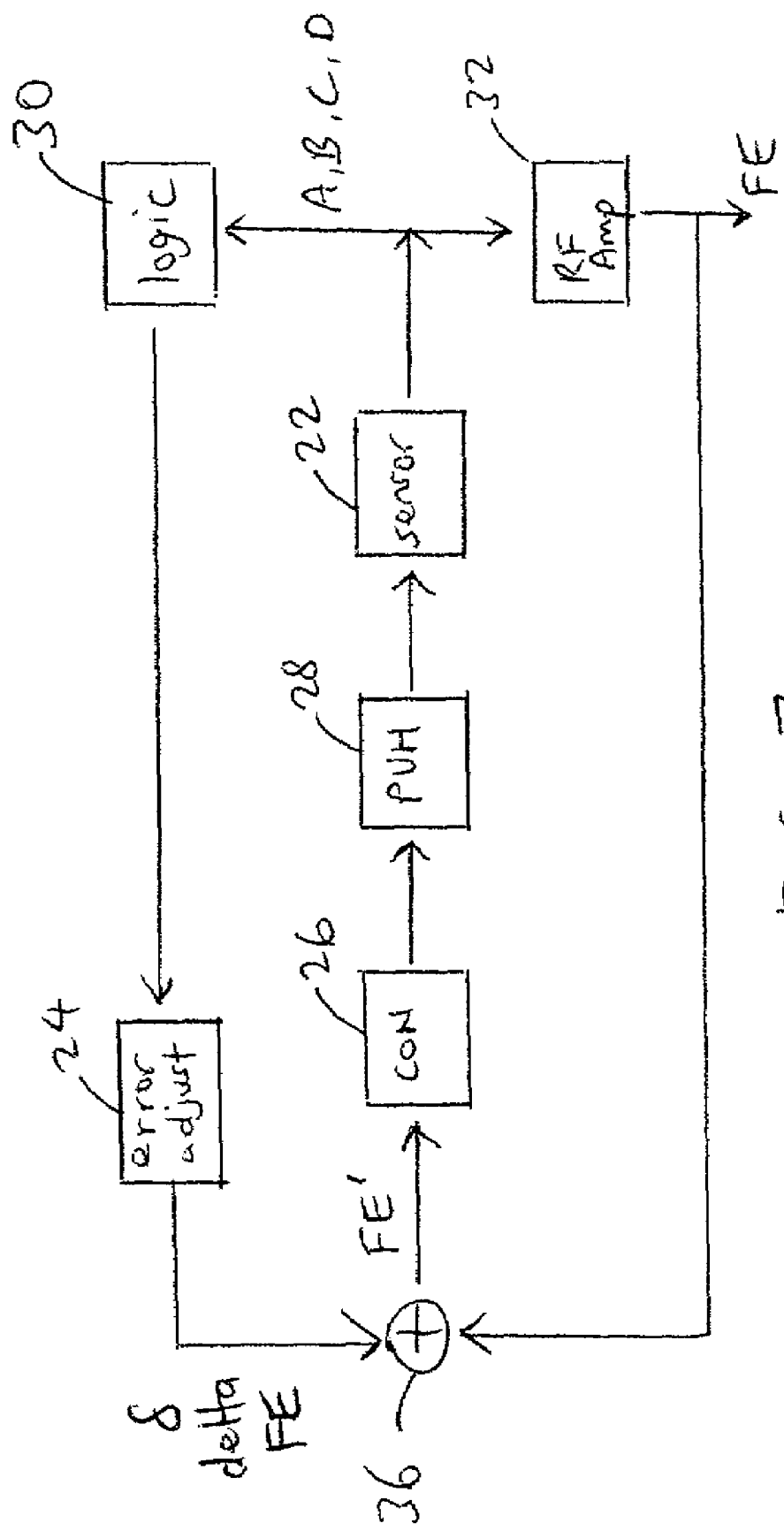
FIG. 7 is a block diagram of one embodiment of an architecture that can be used to implement the principles of the present invention.

Equation (7) can be implemented in the architecture of the error adjustment circuit 24 illustrated in FIG. 8. The circuit 24 illustrated in FIG. 8 can be implemented in the form of hardware, software or in firmware. FIG. 7 illustrates the implementation of the architecture of FIG. 8 in the form of hardware or firmware inside the optical storage system.

In FIG. 7, the optical storage system has a controller 26 having an output coupled to a pick-up head 28 to control the position of the pick-up head 28. The controller 26 can be implemented using, for example, the W88694 manufactured and sold by Winbond Electronics Corp. In other words, the controller 26 can modify the physical position of the pick-up head 28. The pick-up head 28 in turn contains the sensor 22

(which is made up of a plurality of sensor units as is well known in the art) and the lens 16 is carried by the pick-up head 28. The sensor 22 detects the reflected light from the surface 18 of the disk 20, and outputs reflected light in the form of signals representing A, B, C and D. In the case of the spot illustrated in FIG. 6, the signal A is represented by A', q, p and r, the signal B is represented by B' and q, the signal C is represented by C', and the signal D is represented by D' and p. The signals for A, B, C and D are provided to a logic circuit 30 (which can be an analog or mode analog and digital circuit), and to an RF amplifier 32. The RF amplifier 32 converts the A, B, C, D signals to an FE signal that is directed to one input of an adder 36. This FE signal is the signal derived from equation (1) above. The logic circuit 30 converts the A, B, C, D signals into the three inputs shown in FIG. 8, namely (A+B+C+D), (A+B)−(C+D), and (A+D)−(B+C), and outputs these inputs to the error adjustment circuit 24. The circuit 24, which is described in greater detail below, outputs a delta FE signal that is provided to the other input of the adder 36 as an adjustment signal for shifting the S-curve of the FE signal. The output of the adder 36 provides the modified focus error signal FE', which is fed back to the controller 26. The controller 26 utilizes this modified focus error signal FE' to change the position of the pick-up head 28 so as to form a closed-loop control system that maximizes the signal energy of the reflected light received from the sensor 22 carried on the pick-up head 28.

In the circuit of FIG. 7, it is desired for FE' to be 0. If the value of FE' is not zero, the controller 26 will operate to change the position of the sensor 22 carried on the pick-up head 28 so as to maximize the signal energy of the reflected light received from the sensor 22. In other words, at the maximum signal energy, FE' should be zero. Thus, the controller 26 can position the pick-up head 28 any where along the S-curve of FIG. 5. With a stable control system, the zero point will be a convergence point. Referring now to FIG. 8, the error adjustment circuit 24 has a multiplier 34 that has two inputs, with a first input receiving the signal [(A+B)−(C+D)] and a second input receiving the signal [(A+D)−(B+C)]. A divider 38 has two inputs, a first input coupled to the output of the multiplier 34 and a second input receiving the signal (A+B+C+D). The output of the divider 38 is passed through the modifier k, whose output is coupled to an input of the adder 36. The modifier k can include the pi/4 component of equation (7), and the value of k can be tuned or adjusted from pi/4 by varying amounts depending on various changing factors. Examples of these factors can include the rim effect (which is well-known to those skilled in the art) of the spot, uniformity or non-uniformity of the sensor units from one location to another, or other physical considerations. The tuning or adjustment of k can be done based on trial and error calibrations.

At the adder 36, one of the inputs can be negative and the other input can be positive. Here, the output from the modifier k is chosen to be negative, so that delta FE is essentially subtracted from FE. However, this is merely one implementation, as delta FE can be added to FE as well (depending on the degree of modification and the system design).

The present invention can be implemented in analog or digital form. For example, the signals A, B, C and D, as well as the inputs (A+B+C+D), (A+B)−(C+D), and (A+D)−(B+C), can be implemented in analog, digital or mixed formats.

It will be recognized that the above described invention may be embodied in other specific forms without departing from the spirit or essential characteristics of the disclosure.

Thus, it is understood that the invention is not to be limited by the foregoing illustrative details, but rather is to be defined by the appended claims.

What is claimed is:

1. A method of adjusting the focus control for a sensor in an optical storage system where light is reflected from a surface towards a lens, comprising:

receiving a reflected light in the form of a spot, the spot having a center point;

dividing the spot into four quadrants having areas represented by A, B, C and D;

generating an adjustment signal based on the relationship between the areas to determine the variation between the center point of the spot and a desired center point for the spot;

combining the adjustment signal with an existing focus error signal to obtain a modified focus error signal; and utilizing the modified focus error signal to control the position of the sensor;

wherein the adjustment signal is calculated based on the equation:

$$\frac{[(A+B)-(C+D)][(A+D)-(B+C)]}{(A+B+C+D)} * \frac{pi}{4} * k$$

wherein k is a modifier that that is adjusted from pi/4 by varying amounts.

2. The method of claim 1, wherein the adjustment signal is based on the area of a reflection shift of the spot.

3. The method of claim 1, further including utilizing the spot to generate three inputs, (A+B+C+D), (A+B)−(C+D), and (A+D)−(B+C).

4. The method of claim 1, wherein k is a modifier that includes the pi/4 component.

5. The system of claim 1, wherein the varying amounts depend on either the rim effect of the spot, or the uniformity of the sensor, or a combination thereof.

6. An optical storage system, comprising:

a sensor for detecting light that is reflected from a reading surface of a disk, with the reflected light embodied in the form of a spot that has a center point, the sensor generating an output that includes a current focus error signal;

means for dividing the spot into a plurality of areas comprising four quadrants represented by the areas A, B, C and D;

means for generating an adjustment signal based on the relationship between the plurality of areas to determine the variation between the center point of the spot and a desired center point for the spot, wherein the generating means includes:

a multiplier having inputs for receiving first and second signals from the dividing means, and producing an output;

a divider having inputs for receiving the output from the multiplier and a third signal from the dividing means, and producing an output; and a modifier that receives the output from the divider and generates the adjustment signal as its output;

means for combining the adjustment signal with the current focus error signal to obtain a modified focus error signal;

a controller having an input coupled to receive the modified focus error signal, and based thereon, coupled to the sensor for modifying the position of the sensor; and wherein the first, second and third signals are represented by (A+B)−(C+D), (A+D)−(B+C), and (A+B+C+D), respectively.

7. The system of claim 6, further including an amplifier coupled to the output of the sensor.

8. The system of claim 6, further including a pick-up head that carries the sensor, with the controller coupled to the sensor for modifying the position of the sensor.

9. The system of claim 6, wherein the adjustment signal is calculated based on the equation:

$$\frac{[(A+B)-(C+D)][(A+D)-(B+C)]}{(A+B+C+D)} * \frac{pi}{4} *k$$

10. An optical storage system, comprising:
a sensor for detecting light that is reflected from a reading surface of a disk, with the reflected light embodied in the form of a spot that has a center point, the sensor generating an output that includes a current focus error signal;
means for dividing the spot into a plurality of areas;
means for generating an adjustment signal based on the relationship between the plurality of areas to determine the variation between the center point of the spot and a desired center point for the spot, wherein the generating means includes:
a multiplier having inputs for receiving first and second signals from the dividing means, and producing an output;
a divider having inputs for receiving the output from the multiplier and a third signal from the dividing means, and producing an output; and
a modifier that receives the output from the divider and generates the adjustment signal as its output;
means for combining the adjustment signal with the current focus error signal to obtain a modified focus error signal;
a controller having an input coupled to receive the modified focus error signal, and based thereon, coupled to the sensor for modifying the position of the sensor; and
wherein the modifier is (pi/4 )*k.

11. The system of claim 10, wherein the value of k is adjusted from pi/4 by varying amounts depending on either the rim effect of the spot, or the uniformity of the sensor, or a combination thereof.

* * * * *